US012151259B2

(12) United States Patent
Salimi et al.

(10) Patent No.: US 12,151,259 B2
(45) Date of Patent: Nov. 26, 2024

(54) SEMI-AUTOMATED LASER-GUIDED MECHANISM TO APPLY PASTE BEAD IN BONDING PROCESS FOR FABRICATION OF WIND TURBINE BLADES (71) Applicant: TPI Composites, Inc., Warren, RI (US)

(72) Inventors: Amir Salimi, Providence, RI (US); Bernie Dayalkumar, Portsmouth, RI (US)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/665,108

(22) Filed: Feb. 4, 2022

(65) Prior Publication Data
US 2022/0241812 A1 Aug. 4, 2022

Related U.S. Application Data (60) Provisional application No. 63/145,785, filed on Feb. 4, 2021.

(51) Int. Cl.
*B05C 1/02* (2006.01)
*B29C 65/00* (2006.01)
(Continued)

(52) U.S. Cl.
CPC ............ *B05C 1/027* (2013.01); *B29C 65/483* (2013.01); *B29C 65/524* (2013.01);
(Continued)

(58) Field of Classification Search
CPC . B05C 1/027; B05C 17/002; B05C 17/00589; B05C 9/027; B29L 2031/085;
(Continued)

(56) References Cited

U.S. PATENT DOCUMENTS

2010/0038024 A1   2/2010   Brandt
2020/0094286 A1 * 3/2020   Patil ...................... B29C 66/301

FOREIGN PATENT DOCUMENTS

DK        201671011 A1    11/2017
WO    WO-2014048440 A1 *  4/2014   .......... B05C 5/0216
WO    WO-2020233760 A1 * 11/2020   .......... B05C 17/002

OTHER PUBLICATIONS

International Search Report and Written Opinion for International Application No. PCT/US2022/015239 dated May 9, 2022.

* cited by examiner

*Primary Examiner* — Alex B Efta
*Assistant Examiner* — Alexander S Wright
(74) *Attorney, Agent, or Firm* — Stephen J. Kenny; Foley Hoag LLP (57) ABSTRACT Devices, systems, and methods of improving paste flow during the manufacture of wind turbine blades are provided. An apparatus for applying adhesive to a composite structure (e.g. wind turbine blade) comprises a paste shoe having a top surface with an aperture to receive a supply of adhesive, and two legs extending downwardly from the top surface and configured to engage a surface of the composite structure to define an interior volume within the paste shoe. A transport mechanism (e.g. wheels, treads) are disposed on each leg to move the paste shoe relative to the composite structure while adhesive is dispensed within the interior volume. A force applicator, applies a force to the paste shoe to maintain a constant interior volume and thus a uniform bead of paste is applied to the composite structure.

13 Claims, 10 Drawing Sheets (51) Int. Cl.
  *B29C 65/48* (2006.01)
  *B29C 65/52* (2006.01)
  *B29C 70/54* (2006.01)
  *B29L 31/08* (2006.01)
(52) U.S. Cl.
  CPC .......... *B29C 66/721* (2013.01); *B29C 70/546* (2013.01); *B29L 2031/085* (2013.01)
(58) Field of Classification Search
  CPC ... B29C 65/483; B29C 65/524; B29C 70/546; B29C 66/721; B29D 99/0028
  See application file for complete search history.

SEMI-AUTOMATED LASER-GUIDED MECHANISM TO APPLY PASTE BEAD IN BONDING PROCESS FOR FABRICATION OF WIND TURBINE BLADES

CROSS-REFERENCE TO RELATED APPLICATIONS

This application claims the benefit of priority under 35 U.S.C. § 119(e) of U.S. Provisional Application No. 63/145,785 filed Feb. 4, 2021, the entire contents of which are hereby incorporated by reference.

BACKGROUND

Embodiments of the present disclosure relate to devices, systems, and methods of improving paste flow during composite product, e.g. wind turbine blade, manufacture. In particular, the devices, systems, and methods of the present disclosure relate to ensuring proper paste flow and preventing the formation of voids in the paste during a blade close process.

BRIEF SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an apparatus for applying adhesive to a composite structure comprising: a paste shoe including: a top surface configured to receive a supply of adhesive, at least two legs extending downwardly from the top surface and configured to engage a surface of the composite structure to define an interior volume, a transport mechanism disposed on each leg, the transport mechanism moving the paste shoe relative to the composite structure, wherein the adhesive is dispensed within the interior volume; and a force applicator configured to apply a force to the paste shoe.

In some embodiments, the apparatus advances along the leading and trailing edge of a wind turbine blade.

In some embodiments, a laser projects a path for advancement of the paste shoe.

In some embodiments, the paste shoe includes at least one wheel.

In some embodiments, the paste shoe includes a wheel disposed on first and second legs, and a wheel disposed on a front edge of the paste shoe. The wheel on the front edge can steer the paste shoe, and at least one wheel on the legs of the shoe can propel the paste shoe.

In some embodiments, the paste shoe is advanced manually. In some embodiments, the paste shoe is advanced automatically.

In some embodiments, the paste shoe includes at least one sensor, the sensor measuring the force applied to the paste shoe.

In some embodiments, the sensor permits dispensing of adhesive only when a predetermined force is applied.

In some embodiments, the force applicator applies a force to the top surface of paste shoe.

In some embodiments, the force applicator is a handle. In some embodiments, force applicator is ballast.

In some embodiments, amount of ballast is adjustable automatically.

In some embodiments, the transport mechanism is a pair of tracks.

In some embodiments, each track can be operated independently.

In some embodiments, transport mechanism is housed within the leg.

In some embodiments, transport mechanism is disposed on an exterior surface of the leg.

In some embodiments, transport mechanism is powered by a motor disposed within the paste shoe.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION

Modern wind turbine rotor blades are built from fiber-reinforced plastics as fiber-reinforced plastics have high strength-to-weight ratios. A rotor blade typically includes an airfoil shape having a rounded leading edge and a sharp trailing edge and the blade includes a blade root that connects to a hub of the turbine. Multiple rotor blades are connected at the respective blade root to the hub to create the wind turbine. The blade root includes a plurality of root bushings set within the fiber-reinforced polymer that provides reinforcement to the blade. Bolts are engaged with threads in the root bushings to connect the blade root to the hub.

A typical turbine blade is made by molding two half-shells in a pair of molds. A spar cap (analogous to the spar in an aircraft wing), web stiffeners (ribs) and other details may be optionally installed into one of the blade halves. Adhesive is applied to the bonding perimeter/edges of the first shell, for example, in equally-spaced beads. Also, adhesive can be applied to the shear webs and/or spar caps distributed along the length of the blade. The second half shell is then turned over, still in its mold tool, and lowered onto the first. The molds are pressed together and the adhesive is allowed to cure, joining the two halves of the blade together. This process by which the two blade halves are joined together with paste is called blade closure.

The seam along which the two blade halves are joined is a critical junction to the structural integrity of the complete turbine blade. During blade closure, the paste (usually applied in the form of spaced beads along the blade half perimeter) must fill all void space between the two blade halves to avoid any manufacturing defects. However, when the two blade halves are pressed together and because the paste is generally a viscous liquid, the paste may not fill the entire space between the two blade halves, thus forming air voids in the bonding seam that may compromise structural integrity.

Figure 1:
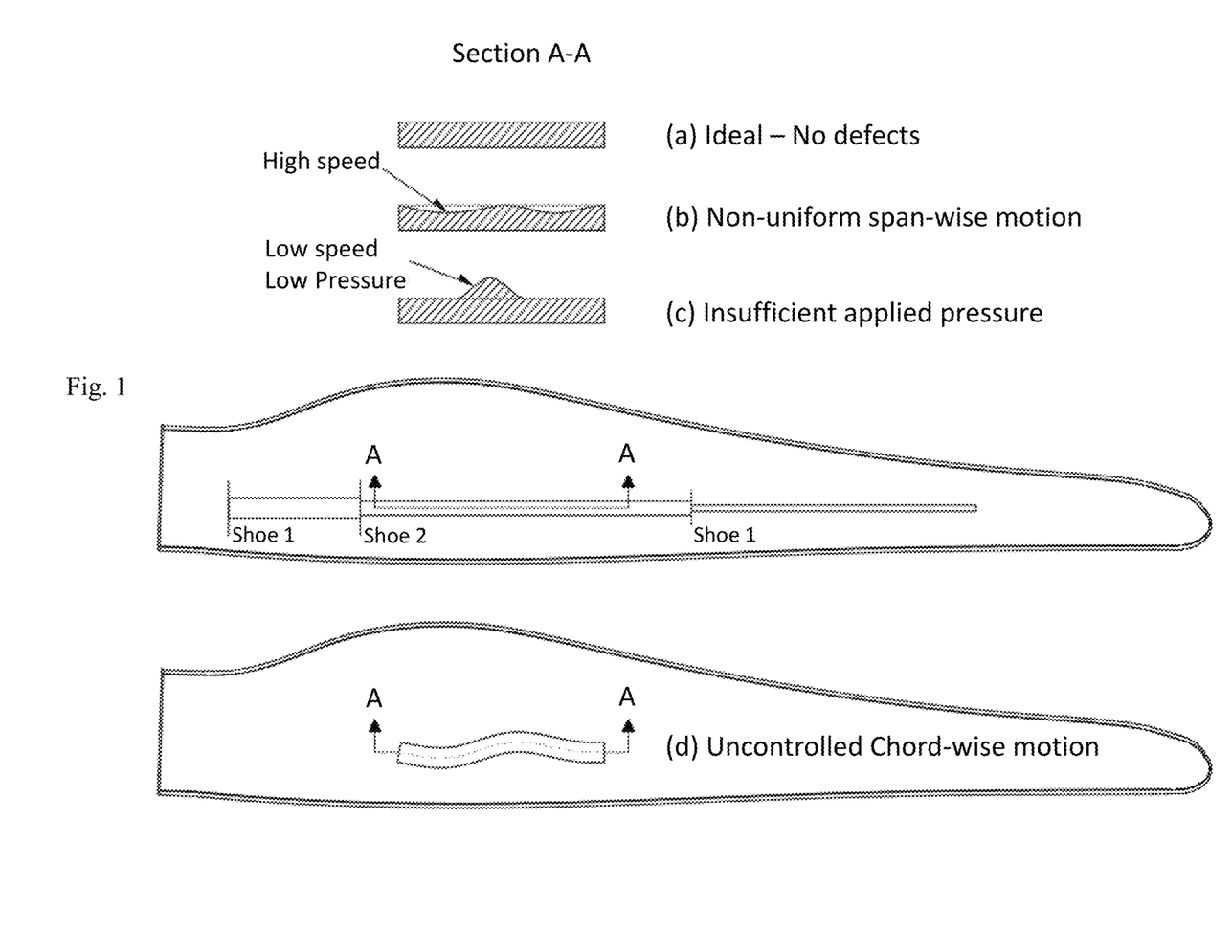
FIG. 1 illustrates an exemplary wind turbine blade, with cross sectional view callouts, identifying adhesive bead application errors.

Frequency and the severity of manufacturing defects can be used as a metric for assessing the quality of our manufacturing process. One of the most common manufacturing defects is the formation of air voids in the bond lines of the final assembled blade. While multiple parameters can contribute to the creation of these defects, inadequate application of paste bead due to operator error is known to be one of the main causes. FIG. 1 depicts how conventional (manual) paste bead application may lead to the application of a non-uniform bead that later leads to formation of voids in the bond line. As shown in FIG. 1, the cross sectional view along A-A of the span between paste shoe 2 and paste shoe 3 (which serve as barriers to limit paste spreading), caption (a) depicts an ideal bond wherein the projected edge of the paste (dashed line) coincides with the actual edge (solid line) of the paste. In contrast, caption (b) depicts the flawed, non-uniform, paste distribution when there is relative spanwise motion between blade shells/halves. Here the projected edge of the paste (horizontal dashed line) does not coincide with the actual edge (undulating solid line) of the paste, which has an undulating pattern. Similarly, caption (c) depicts the flawed, non-uniform, paste distribution when there is insufficient pressure applied during paste application, which leads to a buildup paste at select locations. Likewise, caption (d) depicts the flawed, non-uniform, paste distribution when there is relative chordwise motion during paste application.

Ultrasonic testing may be implemented as quality control to ensure that no air voids are present, and, if air voids are determined to be present, additional paste may be injected into the void space to fill the void. However, this process of screening the entire bond seam is expensive (requiring both technician time and expensive testing equipment) and time intensive. Accordingly, a need exists for a system to improve paste flow during blade closure and prevent the formation of air voids in the paste.

To eliminate potential operator errors and improve the blade's final quality, the present disclosure provides a range of bead application solutions from fully manual to completely autonomous.

Figure 2A:
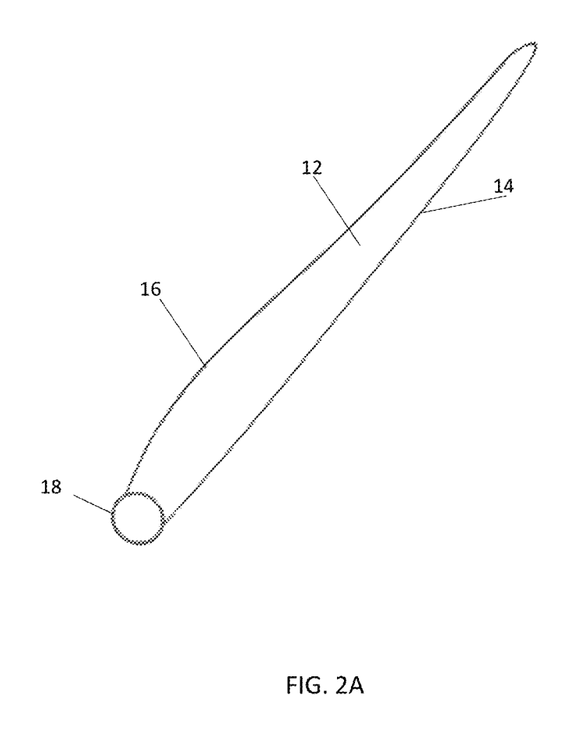
FIG. 2A-C illustrates an exemplary wind turbine blade according to embodiments of the present disclosure.

FIG. 2A illustrates an exemplary wind turbine blade 12 according to embodiments of the present disclosure. A wind turbine blade 12 includes a shell having a leading edge 14 and a trailing edge 16. Any suitable number of blades 12 (e.g., three) may be connected to a hub of a wind turbine at a blade root such that, when wind passes over the blades 12, the blades 12 cause the hub to rotate thereby generating electrical power.

Figure 2B:
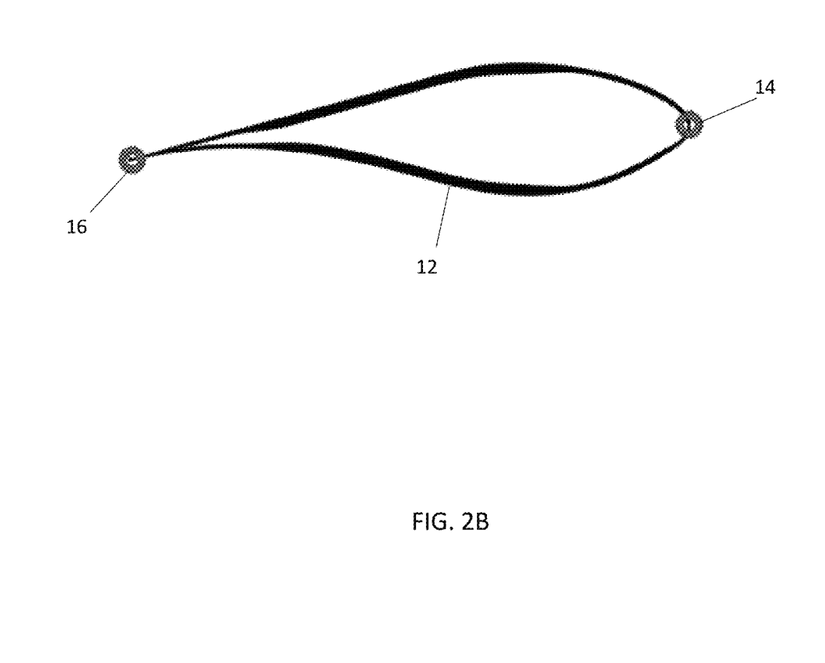

FIG. 2B illustrates a cross section of the wind turbine blade 12 of FIG. 2A according to embodiments of the present disclosure. The cross-section of the wind turbine blade 12 is generally shaped as an airfoil and includes a leading edge 14 and a trailing edge 16 as described above.

Figure 2C:
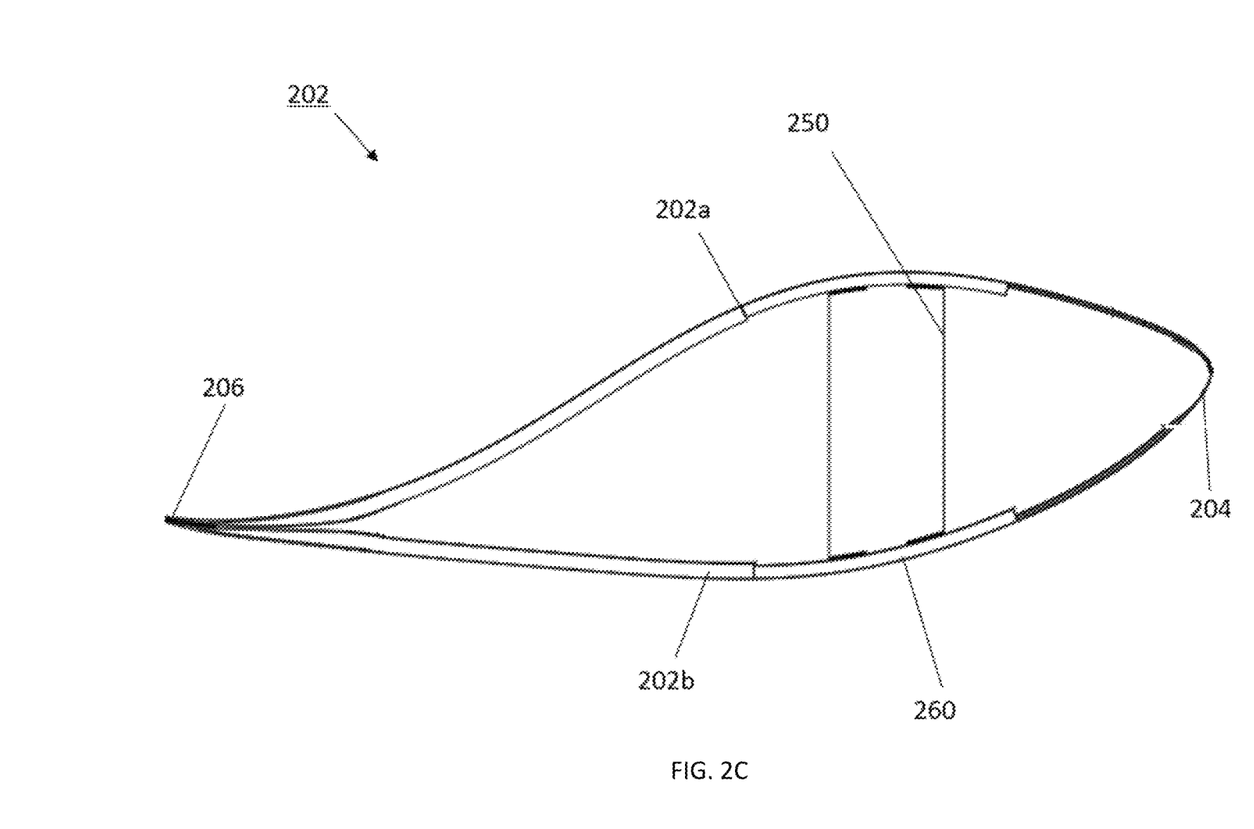

FIG. 2C illustrates a cross-section of an exemplary wind turbine blade 202 during blade closure according to embodiments of the present disclosure. The wind turbine blade 202 is generally shaped as an airfoil having a leading edge 204 and a trailing edge 206 and is manufactured from a polymer reinforced composite. During manufacture of the blade 202, the blade 202 may be manufactured as two halves (first half 202a and second half 202b) and subsequently fixed to one another by, for example, an adhesive paste applied at the interface. To affix the first blade half 202a to the second blade half 202b, paste is applied to the perimeter of one or both blade halves 202a, 202b. In some embodiments, adhesive is applied at select locations along the blade span; in some embodiments, the adhesive is applied continuously along the entire blade span. Each blade half 202a, 202b is positioned inside of the respective mold half 210a, 210b and the mold halves 210a, 210b and blade halves 202a, 202b are brought together.

As shown in FIG. 2C, the present disclosure is applicable to a variety of blade designs, including ones with shear web(s) 250 and corresponding spar caps 260. The upper and lower mold skins can also include a core material, e.g. having an increasing thickness from the midpoint to trailing edge of the blade.

Figure 3:
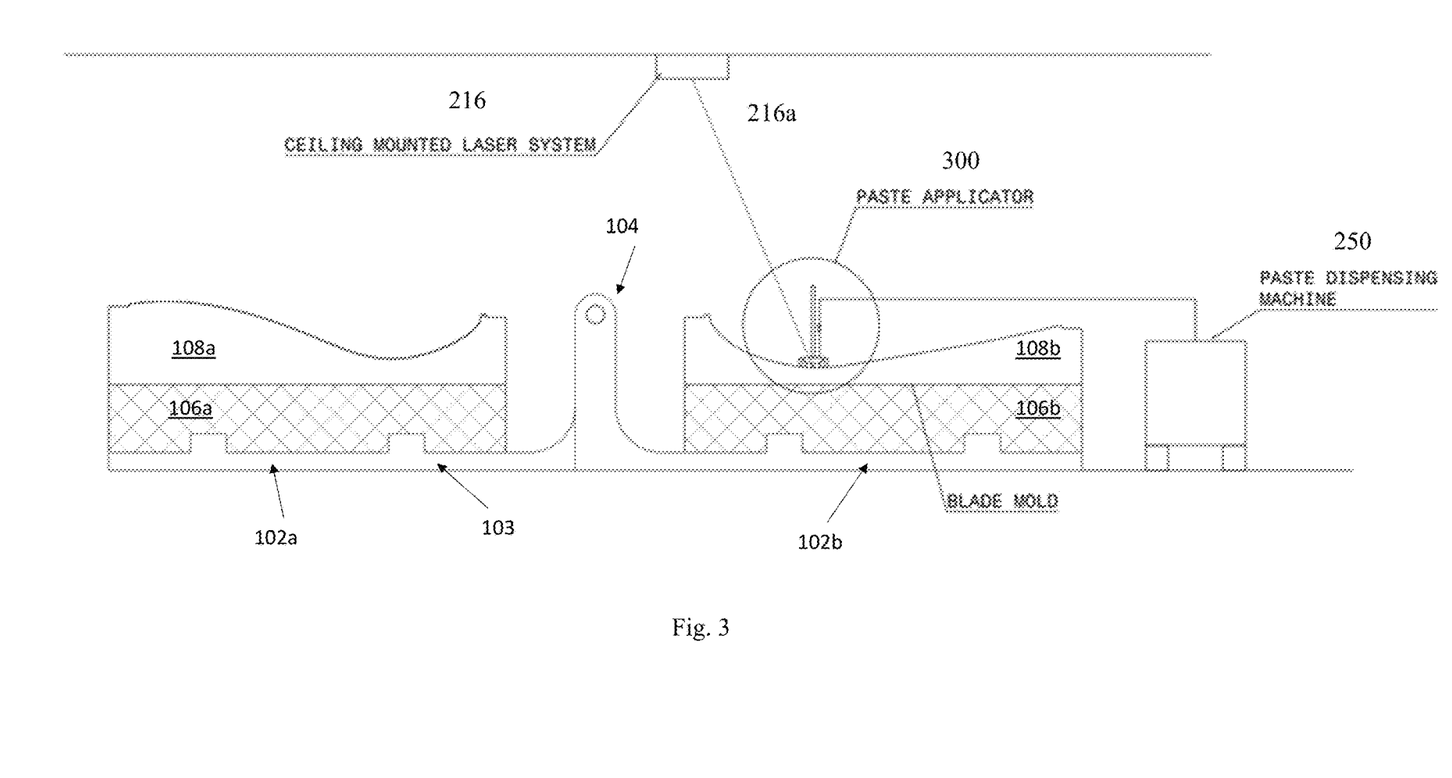
FIG. 3 illustrates an exemplary wind turbine blade adhesive paste application system having a semi-autonomous paste application control, according to embodiments of the present disclosure.

FIG. 3 illustrates an exemplary molding and paste application assembly for wind turbine blade manufacture according to embodiments of the present disclosure. The assembly includes a first base frame 102a and a second base frame 102b that are rotatably coupled together via hinges 104. Each of the base frames 102a, 102b are generally L-shaped (i.e., having a shorter vertical leg, and a longer lateral leg) with the hinges 104 being disposed at the end of the shorter vertical leg. One skilled in the art will recognize that the base frames 102a, 102b may include any suitable shape (not just L-shaped) as is known in the art.

In some embodiments, as shown in FIG. 3, the base frames 102a, 102b can include interlocking features that engage the tooling frames 106a, 106b, respectively. These interlocking features 103 serve to matingly secure of couple the base frame 102 to the tooling frame 106 to prevent relative movement. In the exemplary embodiment shown, each of the base frames 102a, 102b include a plurality of projections 103a, 103b extending perpendicularly, e.g. upwardly, from the longer leg. The projections 103a, 103b may include any suitable predetermined shape, e.g., cylindrical, box, or cube, as is known in the art. In operation, a tooling frame 106a, 106b which is sized to form a particular blade design specification (i.e. weight, length, camber, etc.), can be loaded onto the underlying base frames 102a, 102b. Similarly, the tooling frame 106 can be removed from the base frame 102 and replaced with another tooling frame of a different size/shape to accommodate the dimensions dictated by a second blade specification.

The molding assembly 100 further includes a first shell mold 108a disposed on the first tooling frame 106a and a second shell mold 108b disposed on the second tooling frame 106b. The first shell mold 108a includes a mold surface corresponding to one half of a wind turbine blade and the second shell mold 108b includes a mold surface corresponding to the other half of the wind turbine blade. The mold surfaces may be polished and/or treated such that parts molded from the surface may be easily extracted (e.g., do not stick to the mold). The shell molds 108a, 108b each include a perimeter that, when the second shell mold 108b is rotated on top of the first shell mold 108a, the perimeters contact one another. Additionally or alternatively, the shell molds 108 may have a removable layer on the top surface for interfacing with the blade materials, this removable layer can be detached and discarded after formation of the blade to preserve the surface of the shell mold 108 for the next blade formation. For example, a mold flange insert can be attached to the trailing edge sections of the shell molds 108a, 108b to facilitate bonding along the trailing edge.

Once the desired combination of modular frames 102, 106 and 108 are assembled, a wind turbine blade is manufactured, with one half of the blade formed in each mold half 108a and 108b. An exemplary technique for forming the composite blade includes vacuum assisted resin transfer molding (VA-RTM). In such a technique, resin is drawn into the mold via vacuum force, which requires low heat and pressures. This technique allows for large component manufacture with deep draw ad high fiber volume fractions and low void formations.

In various embodiments, the base frames, tooling frames, and/or shell molds may be made out of any suitable metal as is known in the art. In various embodiments, the mold and/or barriers may include a metal, such as, for example, aluminum, steel, stainless steel, titanium, tantalum, tungsten, or any suitable combination of metals (e.g., a metal alloy). In various embodiments, the base frames, tooling frames, and/or shell molds may include a polymer, for example, polyethylene, polyurethane, polyethylene terephthalate, polyvinyl chloride, etc. In various embodiments, the base frames, tooling frames, and/or shell molds may be made by machining (e.g., CNC machining), 3D printing (e.g., using Direct Metal Laser Sintering (DMLS) and Fused Deposition Modeling (FDM)), open molding, closed molding, resin infusion, compression molding, composite hand layup, injection molding, pultrusion, automated fiber placement, tube rolling, automated tape laying, filament winding, resin transfer molding, or any suitable manufacturing technique as is known in the art. One skilled in the art will recognize that any suitable 3D printing technique may be used to manufacture the components described herein.

The system disclosed herein can further include a laser projection system 216. The laser projection system 216 may project one or more light patterns 216a onto the shell molds 108a, 108b to guide placement of paste along the blade edge(s) and/or shear web and spar caps. The laser projection system 216 may include the laser projection system described in U.S. application Ser. No. 16/235,325 and U.S. patent application Ser. No. 16/023,891 which are hereby incorporated by reference herein in their entirety. Alternatively, permanent marks/lines can be formed with ink or chalk to denote the adhesive application location/path.

In accordance with an aspect of the present disclosure, the system includes a resin or paste injection system. In some embodiments the injection system includes a plurality of conduits and a pump mechanism, to generate the force to deliver the resin/paste, which can be housed external/adjacent to the mold frame 106. The adhesive paste can be dispensed around the perimeter of the lower mold half 108a, along leading and trailing edges either as a continuous bead or as discrete amounts at select locations. In some embodiments, the injection system can be housed, at least partially, within a mold frame 106.

The adhesive/paste can be ducted to an applicator 300 which is disposed above the top surface of the blade skins, and can be moved relative to the mold halves. (Although the applicator is shown in the upper mold half 108b in FIG. 3, the applicator can also be disposed and operated within the lower mold half 108a). A tank or reservoir 250 housing the paste can be provided as a separate component from the applicator 300, with flexible hosing fluidly coupling the two components, as shown in FIG. 3. In some embodiments, tank 250 can be moved in tandem with the dispenser 300. Also, in some embodiments tank 250 can be elevated to provide a gravity-assist feed of the paste through the hosing and to the outlet nozzle(s) disposed within the dispenser 300 (or "rover").

Figure 4:
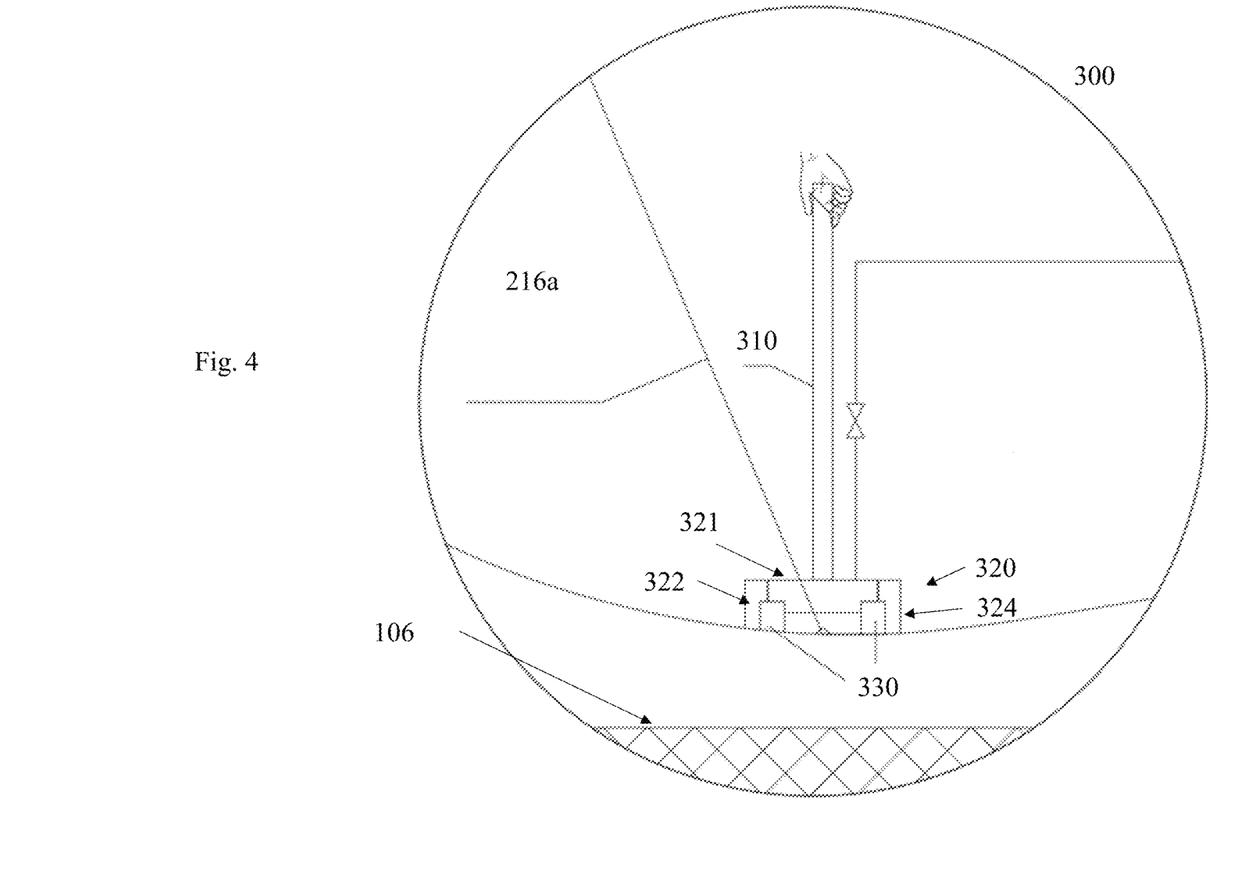
FIG. 4 illustrates an exemplary wind turbine blade adhesive paste application system having an autonomous paste application control, according to embodiments of the present disclosure.

FIG. 4 illustrates an enlarged view of the applicator 300, which in the exemplary embodiment shown, includes a handle 310, and adjustable shoe 320, and a moveabale base (or "rover") 330. In this embodiment, the handle 310 can extend vertically upward from the top surface of the adjustable shoe, and be used to impart a downward force on the shoe 320 to remove/prevent air from mixing with the paste upon dispensing (e.g. by blocking air ingres under the bottom of the shoe sidewalls). The handle 310 can include a sensor or gauge to indicate the amount of force applied, and the amount of force required to avoid formation of air voids (which is a function of shoe size 320 and paste viscosity). If the force applied to the handle does not match the force required, an alert (audible, visible and or tactle) can be generated.

Additionally, the handle 310 can include a guide means (e.g. bracket) to ensure the nozzle which dispenses the paste onto the blade skin is oriented at the correct angle with respect to the blade skin. For example, FIG. 4 illustrates the handle 310 (and nozzle disposed therein) oriented at approximately 90 degrees to the blade skin; additional or alternative angles can be set, as so desired, to accommodate the blade contour. The handle 310 can house the hosing carrying the paste internally, thus preventing any damage or bending/kinds to the hosing. Additionally or alternatively, the hosing can be located external to the handle 310. Also, handle 310 can be sized to extend upwardly a distance (e.g. 3 feet) to allow a user to easily grab the handle and apply a downward force. In some embodiments, the height of handle 310 can be adjusted telescopingly. Additionally or alternatively, the handle can be moved (e.g. rotated and or pivoted) relative to the paste shoe 320 to adjust the angle or vector of the force applied (as well as the angle the paste is dispensed for embodiments in which the dispensing nozzle is located within the handle).

A plurality of dispensers 300 can be deployed to simultaneously, or intermittently, apply paste along the desired locations/paths about the blade. The shoe(s) 320 can include a generally planar top surface 321, having two legs 322, 324 extending downward and be formed as an integral, unitary structure. In operation, the paste flows through the handle 310, is dispersed within the top 321 of the shoe such that a portion is diverted towards each leg 322, 324, and dispensed out of each leg 322, 324 onto the blade surface. Additionally or alternatively, the paste can be dispensed from a location spaced from the handle, e.g. at a separate port located in the top 321 of shoe 320. Thus, paste can be dispensed from a number of locations within the shoe, either independently or simultaneously.

In some embodiments sensors can be incorporated (e.g. placed on interior walls) within the shoe 320 to detect when paste has completely filled the volume within the shoe in order to ensure no air pockets/voids exist. Additionally or alternatively, a flowmeter can be incorporated to measure the dispensing rate/amount of paste and adjust the speed of the shoe accordingly to achieve the desired amount of paste. For example, the flow meter can adjust the rate of paste dispensed in accordance with the speed the paste shoe travels along the blade. Positioned adjacent to the legs 322, 324 are transport mechanisms 330 (e.g. wheels) for advancing the dispensers 300 along the desired paste path. It should be noted, although reference will be made herein to "wheels", it will be apparent to artisans of ordinary skill that any suitable transport means can be employed, e.g. rails, treads, etc., all of which are within the scope of the disclosure.

In the exemplary embodiment shown in FIG. 4, a user manually operates the dispensing apparatus 300 to manually operate the transport mechanism (330) to move the dispenser 300 along the paste path, while also applying the desired amount of force through handle 310 to ensure shoes 320 maintain a uniformly dispensed bead of paste (w/o air voids). In other words, the transport mechanism is a passive system that does not generate any propulsion independent of the force applied by the user. Also, the user can adjust the shape or geometry of the paste applied by varying the pressure, and/or angle, of the handle 310 during paste dispensing to ensure a continuous adhesive profile.

Figure 5:
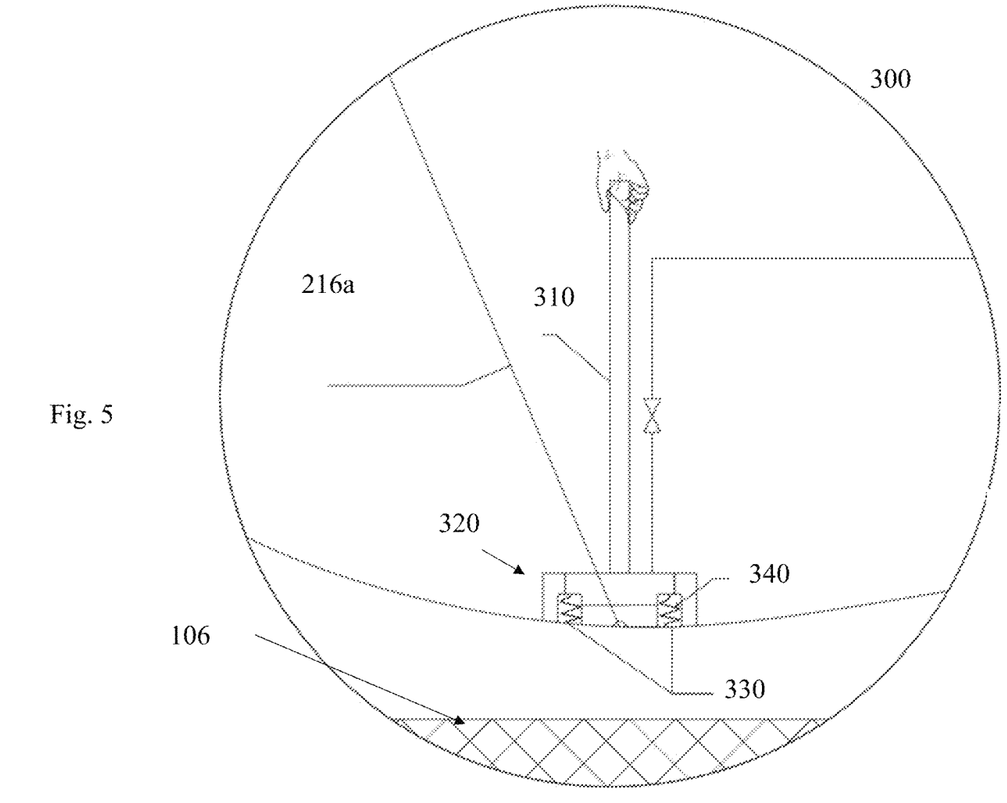
FIG. 5 illustrates an exemplary rover for guiding a wind turbine blade adhesive paste application system, according to embodiments of the present disclosure.

FIG. 5 depicts another embodiment of the present disclosure, wherein the system includes automated actuation and navigation modules to guide the dispenser along a predetermined path and adjust the amount of paste dispensed according to the particular location on the blade. The steering along the blade skin, and downward pressure to resist displacement due to paste dispensing within the shoe, can be provided manually (e.g. via handle 310), while the propulsion of the dispensing apparatus 300 is provided automatically. The propulsion of the dispenser 300 can be activated once a sufficient downward force is detected. For example, the dispenser can include sensors 340 disposed within one, or both, legs 322, 324 for sensing downward force/displacement, as shown in FIG. 5. A variety of sensors 340 can be employed including piezoelectrics, digital gauges (e.g. stress/strain), as well as mechanical sensors (e.g. springs). Once a sufficient downward force is applied and detected by the sensors 340, a propulsion system activates to drive the dispenser 300 along the blade path to dispense the paste within the shoe.

The flow of adhesive can be controlled by the translational motion/velocity to guarantee a uniform controlled bead of paste is applied. For example, if the dispenser 300 is stopped, the dispensing of adhesive can be suspended until movement resumes. The dispenser 300 can also include embedded location detection (e.g. GPS) module which navigates the dispenser 300 along a predetermined blade path. The onboard navigation system ensures chordwise uniformity of the paste bead applied to the blade. Additionally or alternatively, the dispenser 300 can include a camera for detecting the overhead laser projection 216a line and guiding the dispenser along that line. In the event the dispenser 300 deviates from the projected path 216a, the dispensing nozzle can be closed to prevent adhesive from being applied outside of the desired path.

Propulsion of the dispenser 300 can be provided via a battery powered motor and drive train that actuates wheels contained within the legs 322, 324 of the dispenser. Shock absorbers and/or struts can be included within the legs 32, 324 to allow the housing of the dispenser to be displaced downward to engage the blade skin and ensure a closed volume within the paste shoe for adhesive application. Here, the forward translational motion of the dispenser 300 is motorized to provide longitudinal uniformity of paste along the blade.

Figure 6:
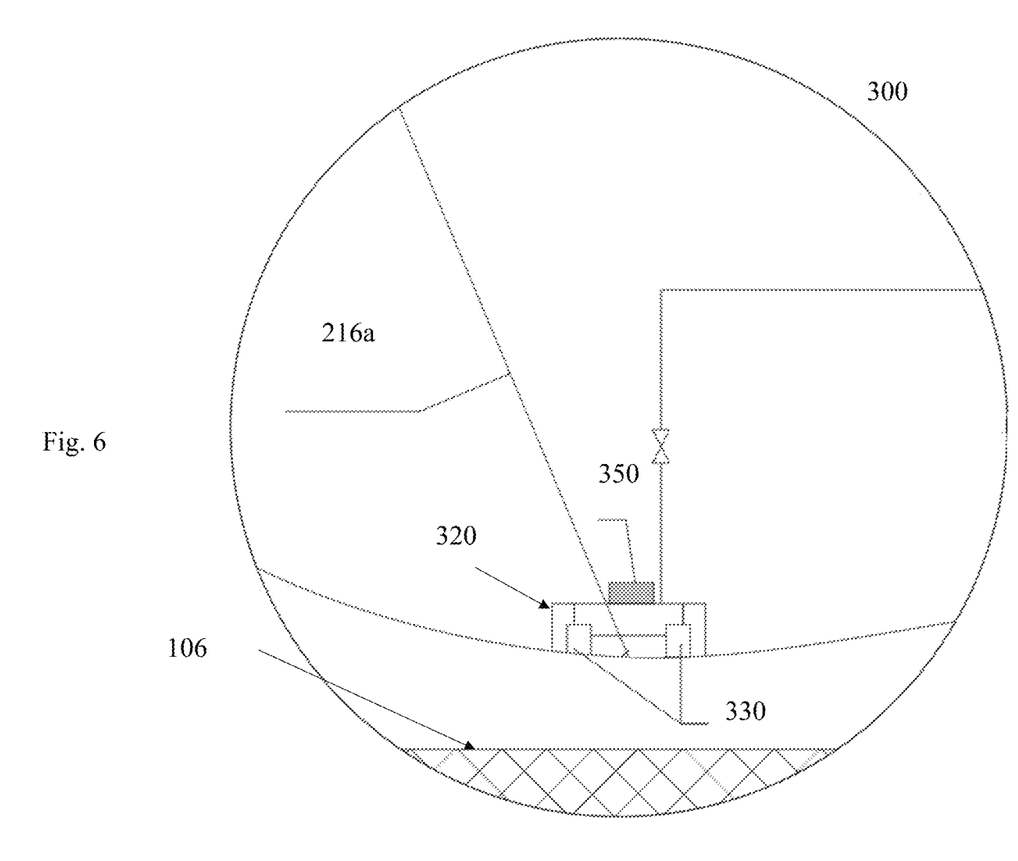
FIG. 6 illustrates an exemplary rover for guiding a wind turbine blade adhesive paste application system, according to embodiments of the present disclosure.

In some embodiments, the paste application can be entirely automated. For example, FIG. 6 depicts a fully autonomous dispensing system 300 in which the handle (as previously described in connection with FIGS. 4-5) is omitted. In such embodiments, a ballast 350 can be applied to the paste shoe 320 to provide the downward force to counteract the adhesive's hydraulic pressure (which urges the shoe upward) when filling up the interior of the shoe. The amount of ballast can be adjusted to accommodate varying internal hydraulic pressures, depending on the amount of adhesive applied, and/or internal volume of the paste shoe 320. For example, the ballast can be provided in the form of water, or removable weights, and can be distributed evenly about (e.g. on top of) the shoe 320. Once the appropriate level of ballast 350 has been confirmed by sensors within the shoe 320, the on board motor will activate to propel the shoe along the desired path—as projected by the overhead lasers 216a. Sensors can also be employed to control the speed of the dispenser 300 to ensure a uniform paste bead is deposited, according to the adhesive being extruded. Accordingly, the adjustable shoe 320 can be controlled to provide a paste bead with any cross-sectional shape desired (e.g. wider at spar cap/shear web locations than leading/trailing edge locations). In some embodiments, the shape of the shoe itself can change, e.g. sidewalls moved relative each other to change volume of geometry of internal cavity, so that the geometry of the paste bead can be tailored as desired.

Figure 7:
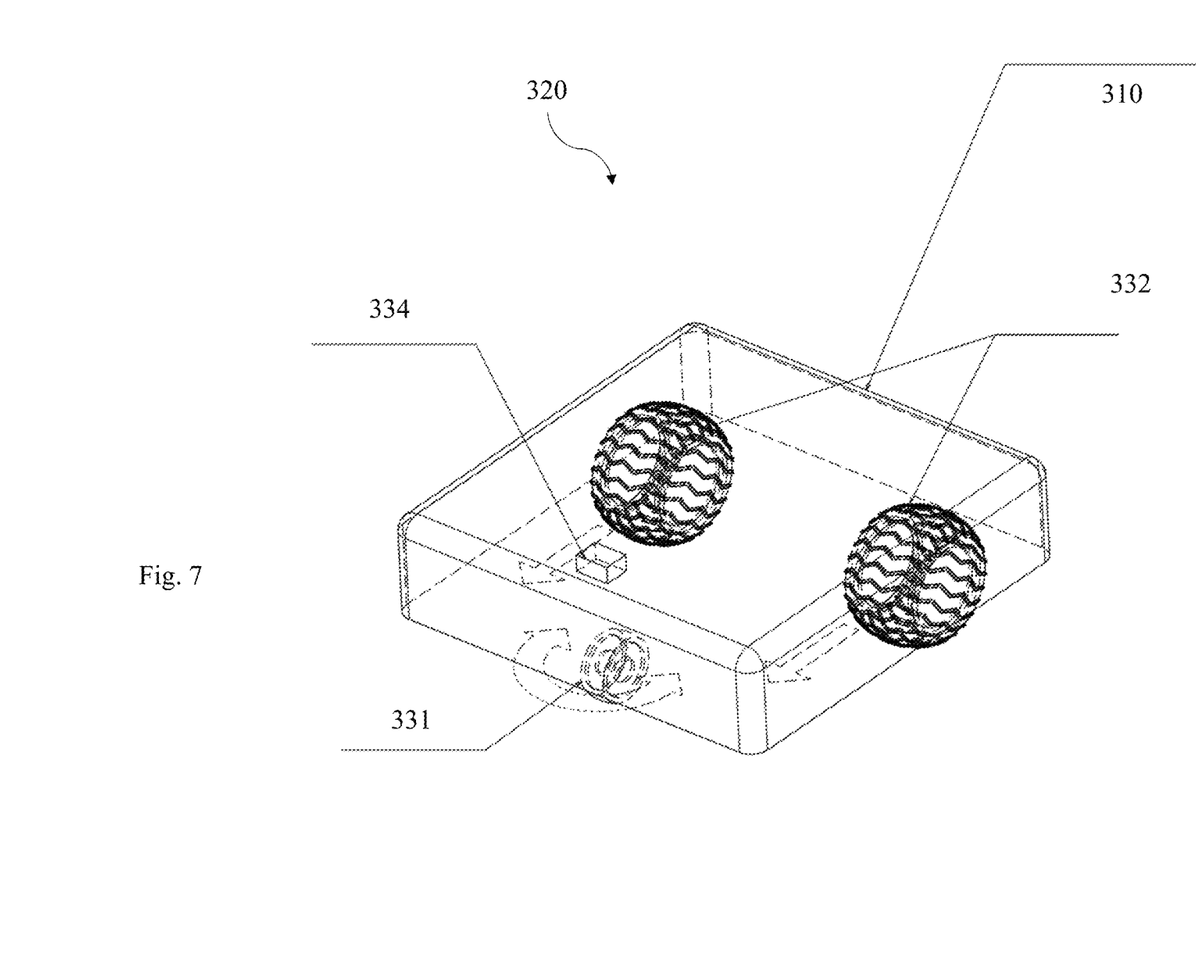
FIG. 7 illustrates an exemplary transport mechanism including a plurality of wheels for moving the paste dispenser disclosed herein.

FIG. 7 illustrates an exemplary embodiment of the shoe 320 driving apparatus which includes a pair of wheels 332 disposed on opposing sides of the shoe, with a lead steering wheel 331 disposed on the front side of the shoe 320. The front wheel(s) 331 can pivot left/right as shown by the arrow shown in phantom lines. The pathfinder (e.g. camera) 334 detects the path illuminated by the overhead laser projector, and steers the front wheel 331 accordingly to remain on the path, which the drive wheels 332 adjust the speed to ensure a uniform bead of paste is deposited on the blade surface. In some embodiments, a handle 310 can be included, e.g. at the rear edge as shown, to provide a manual operation or supplementation of the automated operation if so desired. (The paste dispensing apparatus is omitted here for clarity sake).

Figure 8:
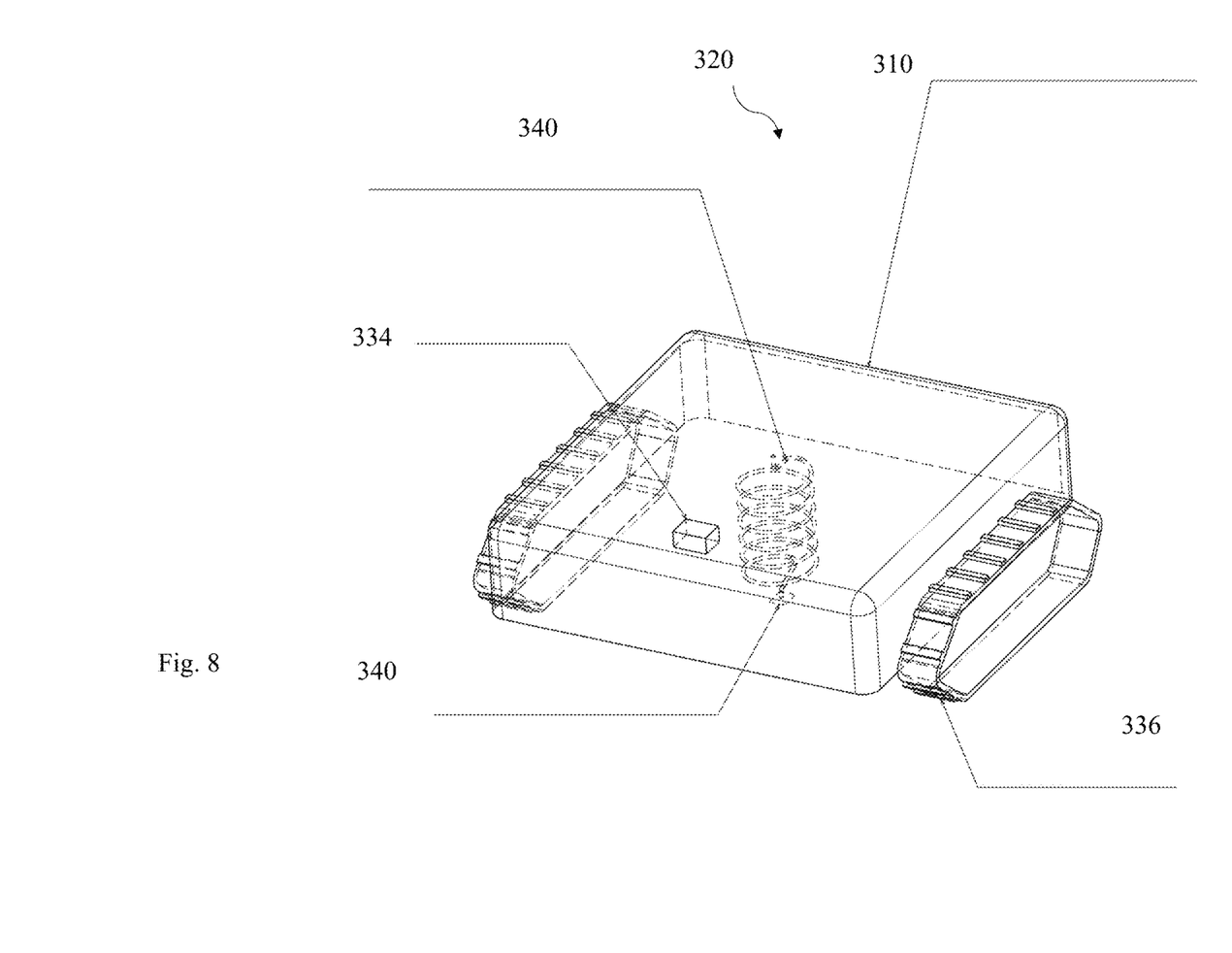
FIG. 8 illustrates an exemplary transport mechanism including a plurality of treads/tracks for moving the paste dispenser disclosed herein.

FIG. 8 illustrates an exemplary embodiment of the shoe 320 driving apparatus which includes a pair of treads/tracks 336 disposed on opposing sides of the shoe. Similarly to the exemplary embodiment of FIG. 7 described above, a pathfinder (e.g. camera) 334 detects the path illuminated by the overhead laser projector, and steers the shoe by adjusting the relative speed of each tread (i.e. increasing/decreasing one tread relative to the other; and/or reversing direction of one tread relative to the other) to remain on the path. Also, the speed of the treads 336 can be adjusted (in tandem) to ensure a uniform bead of paste is deposited on the blade surface. Also, in some embodiments, a handle 310 can be included, e.g. at the rear edge as shown, to provide a manual operation or supplementation of the automated operation if so desired. (The paste dispensing apparatus is omitted here for clarity sake).

Additionally, sensor(s) 340 can be incorporated into the shoe to detect the displacement (or height) of the shoe from the blade surface in order to calculate if the internal shoe volume is consistent to ensure a uniform bead of paste is applied. For example, the sensors can engage the blade surface and the top of the shoe simultaneously, and measure the downward force applied to the shoe (whether from ballast in the fully automated embodiments, or as applied by the user in manual embodiments).

In some embodiments, the shoe includes a plurality of vents disposed along the top of the shoe. The vents can be operable to selectively open/close such that an operator can operate each vent independently to adjust pressure as desired, e.g. to draw the paste from the blade surface towards the top of the shoe 320 to facilitate bonding. The vents may have any suitable shape (e.g. circular). In some embodiments, the vents allow for paste to migrate into and fill the vent and include an inspection feature (e.g. window, aperture, frangible membrane) which provides a visual confirmation that the paste applied therein (i.e. from the interior barrier up to that particular vent) is free of any air pockets/voids.

The paste can be applied along the leading and trailing edges of a blade, and also within interior portions (i.e. chordwise) of the blade, e.g. at locations where spar caps, shear webs, and/or core material is to be installed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for applying adhesive to a composite structure comprising:
    a paste shoe, the paste shoe including:
        a planar top surface, the planar top surface having a nozzle disposed therein configured to receive a supply of adhesive, the supply of adhesive oriented at approximately 90° to the composite structure,
        at least two legs extending downwardly from the planar top surface to define an interior volume, each of the at least two legs in fluid communication with the top surface,
        at least one sensor disposed within the paste shoe, the sensor configured to detect when paste has completely filled the volume within the paste shoe;
        a transport mechanism disposed on each leg, the transport mechanism configured to engage a surface of the composite structure and move the paste shoe relative to the composite structure,
        wherein the adhesive is dispensed within the interior volume; and
    a force applicator, the force applicator configured to apply a force to the paste shoe; and
    wherein the adhesive is dispensed out of each of the at least two legs once a sufficient downward force of the force applicator is detected.

2. The apparatus of claim 1, wherein the apparatus advances along the leading and trailing edge of a wind turbine blade.

3. The apparatus of claim 2, wherein a laser projects a path for advancement of the paste shoe.

4. The apparatus of claim 1, wherein the paste shoe is advanced automatically.

5. The apparatus of claim 1, wherein the force applicator applies a force to the top surface of paste shoe.

6. The apparatus of claim 1, wherein the force applicator is ballast.

7. The apparatus of claim 6, wherein the amount of ballast is adjustable.

8. The apparatus of claim 6, wherein the transport mechanism includes a pair of tracks.

9. The apparatus of claim 1, wherein each track can be operated independently.

10. The apparatus of claim 1, wherein the transport mechanism is at least partially housed within the leg.

11. The apparatus of claim 1, wherein the transport mechanism is disposed on an exterior surface of the leg.

12. The apparatus of claim 1, wherein the transport mechanism is powered by a motor disposed within the paste shoe.

13. The apparatus of claim 1, wherein the paste shoe is adjustable with the adhesive dispenser configured to be oriented at a plurality of angles.

* * * * *